US008459212B2

(12) United States Patent
Meisenbach

(10) Patent No.: US 8,459,212 B2
(45) Date of Patent: Jun. 11, 2013

(54) REARWARD LEASH POSITIONER

(76) Inventor: Craig Meisenbach, Superior, CO (US)

( * ) Notice: Subject to any disclaimer, the term of this patent is extended or adjusted under 35 U.S.C. 154(b) by 0 days.

(21) Appl. No.: 13/149,050

(22) Filed: May 31, 2011

(65) Prior Publication Data
US 2012/0304943 A1    Dec. 6, 2012

(51) Int. Cl.
*A01K 27/00* (2006.01)
(52) U.S. Cl.
USPC ............................................ 119/856; 119/792
(58) Field of Classification Search
USPC ................... 119/856, 769, 795, 792
See application file for complete search history.

(56) References Cited

U.S. PATENT DOCUMENTS

| 2,826,172 A * | 3/1958 | Buckle et al. ............... 119/792 |
| 3,678,543 A * | 7/1972 | Hobbs ............................ 182/191 |
| 4,941,434 A * | 7/1990 | Ellwanger ...................... 119/771 |
| 5,511,515 A * | 4/1996 | Brown et al. .................. 119/771 |
| 5,613,467 A * | 3/1997 | Arakawa ........................ 119/792 |
| 5,791,295 A * | 8/1998 | Schmid et al. ................. 119/793 |
| 6,161,505 A * | 12/2000 | Noguero ........................ 119/792 |
| 6,167,844 B1 * | 1/2001 | Cantrell et al. ............... 119/856 |
| 6,220,003 B1 * | 4/2001 | Hung ................................ 54/23 |
| 6,340,001 B1 * | 1/2002 | Hendrie ......................... 119/792 |
| 6,354,247 B1 * | 3/2002 | Andrews ........................ 119/818 |
| 6,401,666 B1 * | 6/2002 | Kircher ......................... 119/792 |
| 6,688,259 B2 * | 2/2004 | Axel .............................. 119/792 |
| 7,107,940 B2 * | 9/2006 | Abinanti ....................... 119/792 |
| 7,299,527 B1 * | 11/2007 | Gyure et al. .................... 24/198 |
| 7,963,255 B2 * | 6/2011 | Horgan ......................... 119/792 |
| 8,171,891 B2 * | 5/2012 | Rubinstein et al. ........... 119/725 |
| 8,171,892 B1 * | 5/2012 | Horgan ......................... 119/792 |

* cited by examiner

*Primary Examiner* — Yvonne Abbott
(74) *Attorney, Agent, or Firm* — Bell & Manning, LLC

(57) ABSTRACT

Leash attachments designed to reduce the tangling of a pet leash around the hind legs of a pet during a walk are provided. The leash attachment can be a rearward leash positioner comprising a strap configured to secure around the torso of a pet. A leash guide member attached to the strap is designed to reposition the fall point of a leash to a position that is rearward of its fall point in the absence of the leash positioner.

12 Claims, 4 Drawing Sheets

-- Prior Art --

REARWARD LEASH POSITIONER

BACKGROUND

A common problem related to walking a dog with a conventional collar and leash is that the leash can become entangled in the hind legs of the dog when the leash goes slack—as when the dog and walker come to a stop. This problem is exacerbated when the dog "walker" is actually jogging or riding a bike because the tension of the leash can change rapidly when the dog and "walker" stop suddenly. Although this problem can be addressed by retractable leashes, such leashes add weight and complexity to the leash assembly and require the walker to continually adjust the length of the leash.

SUMMARY

One aspect of the invention provides a leash positioner that includes a strap configured to secure around the torso of a pet, such as a dog, and a leash guide member attached to the strap. The leash guide member is configured to reposition a leash secured to a pet collar around the neck of the pet, such that when the leash is slack it has a fall point that is rearward of its fall point in the absence of the leash positioner. The strap in some embodiments of the leash positioner is not fixedly secured to the pet collar.

The strap can be configured to secure around the torso at various positions along the pet. For example, the strap can be configured to secure around the torso at a position along the back or the loin of the pet.

The leash guide member can be positioned at various locations on the strap and can come in a variety of forms. For example, the leash guide member can be positioned such that it lies above the torso of the pet when the strap is secured to the pet. Alternatively, the leash guide member can be positioned such that it lies to one side of the torso of the pet when the strap is secured to the pet. Non-limiting examples of leash guide members include closed loops and partially closed loops.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Leash attachments designed to reduce the tangling of a pet leash around the hind legs of a pet during a walk are provided. In one embodiment, the leash attachment is a rearward leash positioner of the type shown in FIGS. 2-5 comprising a strap 202 configured to secure around the torso 204 of a pet. A leash guide member 206 attached to the strap is designed to reposition the fall point 208 of a leash to a position that is rearward of its fall point in the absence of the leash positioner. The leash attachments are particularly well-suited for use with dogs, but could also be used for other pets, including other quadrupedal, household pets, such as cats, ferrets, and the like.

Figure 1:
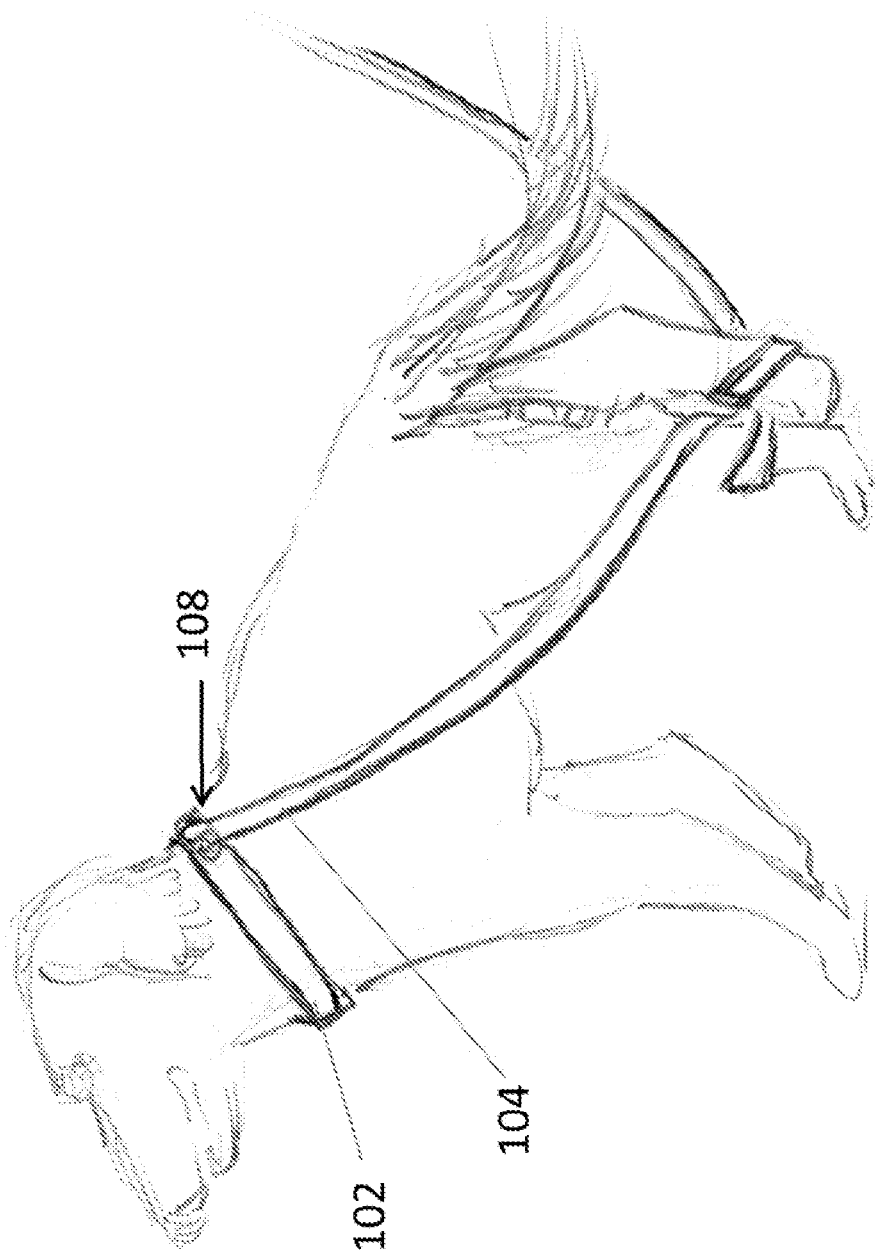
FIG. 1 depicts a dog wearing a traditional collar and leash assembly. This figure illustrates the problem of a leash tangling around the hind legs of the dog when the handle end of the lease is slack.
Figure 2:
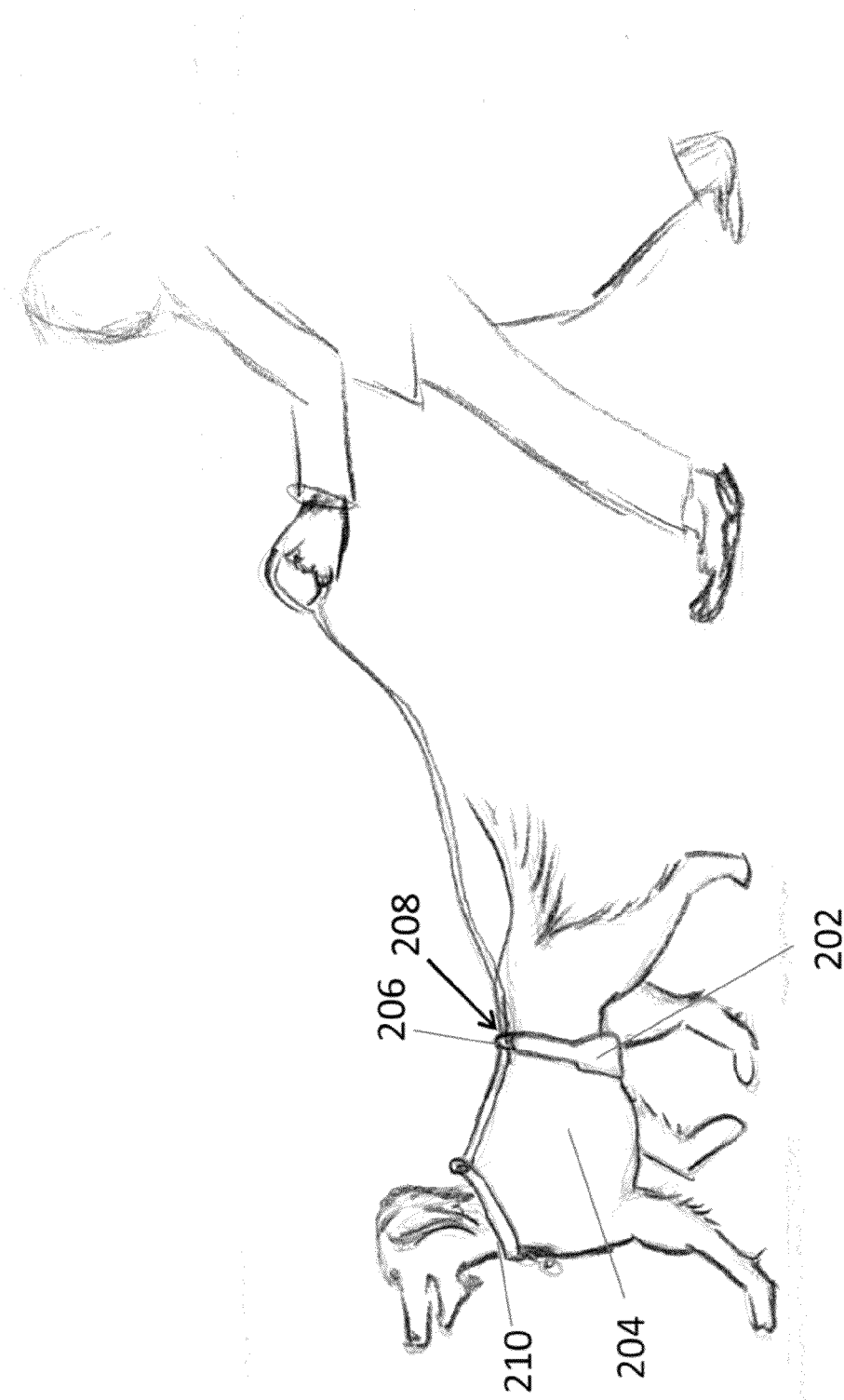
FIG. 2 depicts a dog wearing a leash positioner in accordance with the present invention.

For the purposes of this disclosure, the "fall point" of a leash is the point along length of the leash where it begins to fall to the ground when the handle end of the leash is slack. The concept of a "fall point" is illustrated in FIG. 1, which shows a traditional collar 102 and leash 104 assembly. As shown in this figure, the fall point 108 for a traditional leash is located at or near the point at which the leash is secured to the collar of the pet. In contrast, the more rearward fall point 208 for a leash positioner in accordance with this invention is shown in FIG. 2.

Although the present leash positioners are designed to be used with a leash that is secured to a pet collar 210 around the neck of a pet, they need not be fixedly secured to the pet collar. For the purposes of this disclosure, a leash positioner is "not fixedly secured" to a pet collar if it is designed to be completely removed from the pet and completely detached from the pet collar and leash without removing the pet collar from the pet. Because the present leash positioners are not fixedly secured to a pet collar, they can easily be used with a variety of traditional collar and leash assemblies. In addition, they give the owner of the pet the option of walking their pet with or without the leash positioner.

Figure 3:
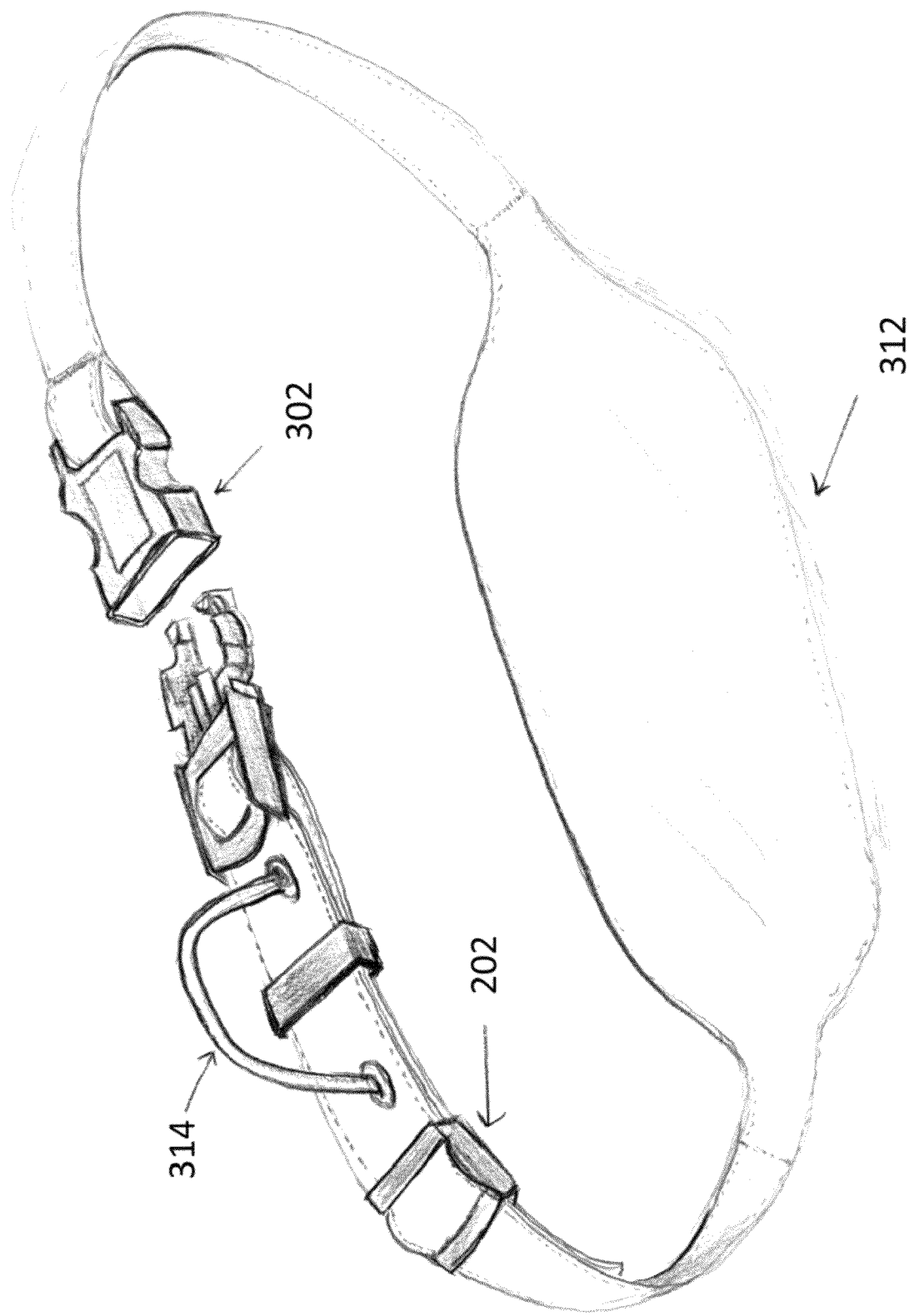
FIG. 3 depicts an embodiment of a leash positioner that includes a strap, a closed-loop leash guide member, a clasp for securing the strap around the torso of a pet, and a padded area.

The mechanism for securing the strap around the torso of a pet can take on a variety of forms and can include a mechanism to loosen or tighten the strap to fit the torso of a particular pet. For example, the strap can include snaps, Velcro pads, buckles, hooks, buttons, and the like, for fastening the strap about the pet. By way of illustration, FIG. 3 shows an embodiment of a leash positioner that can be secured around the torso of a pet using a clasp 302. The strap can optionally include padding to enhance the comfort of the pet. For example, the straps shown in FIGS. 3 and 4 include padded regions 312, 412 configured to be positioned below the torso of the pet when the straps are in place.

The size of the strap will depend, at least in part, on the location along the pet's torso about which it will be secured. For example, in some embodiments, the strap may be configured to secure around the torso at a position along the back of the pet, as shown in FIG. 2. In some embodiments, the strap is configured to secure around the torso at a position along the loin of the pet. For the purposes of this disclosure, the "back" of the pet is located between the top of the shoulder, just behind the neck and the loin, while the loin of the pet is located between the pet's ribs and hips.

Figure 4:
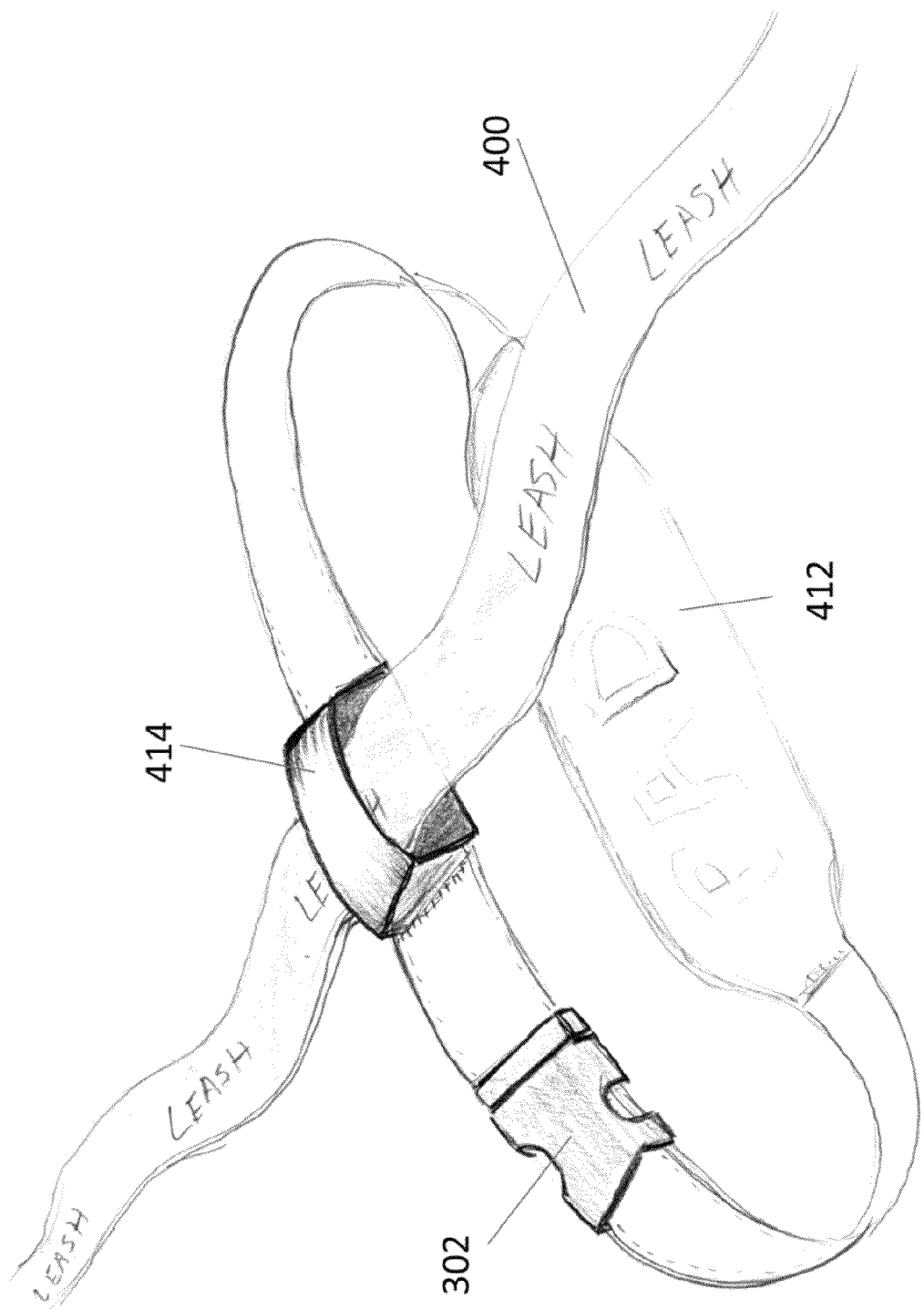
FIG. 4 depicts an embodiment of a leash positioner that includes a strap, a closed-loop leash guide member, a clasp for securing the strap around the torso of a pet, and a padded area. A leash inserted through the closed loop is also shown.

The leash guide member can also take on a variety of forms. For example, the leash guide member can comprise a closed loop 314, 414, as shown in FIGS. 3 and 4. In embodiments where the leash guide member is a closed loop, a pet leash 400 secured to a pet's collar can simply be inserted through the loop in order to move the fall point of the leash rearward from the collar, as shown in FIGS. 2 and 4. In other embodiments the leash guide member can include, for example, a joint that allows the loop to be opened and closed. In such embodiments the loop can be opened, the leash inserted through the opening, and the loop can then be re-closed around the leash. In another illustrative embodiment, the leash guide member is a partially-closed loop having a side opening large enough to allow for the lateral insertion of a leash into the loop. In some embodiments, the leash guide member can be positioned such that it is lies above the torso of the pet when the strap is secured to the pet (see, for example, FIG. 2), while in other embodiments the leash guide member can be positioned such that it lies to one side of the torso of the pet when the strap is secured to the pet.

The extent to which the fall point of a leash is repositioned rearward by the leash positioner will depend, at least in part, upon the particular design of the leash positioner and the dimensions of the pet. However, in some embodiments, the leash positioner is configured to reposition the fall point of a leash rearward at least as far back as the back of the pet, the loin of the pet, or the rear hip of the pet.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A leash positioner comprising:
    a pet collar configured to be secured around the neck of a pet;
    a leash secured to the pet collar;
    a strap configured to secure around the torso of a pet, wherein the strap is not fixedly secured to the pet collar; and
    a leash guide member attached to the strap and configured to reposition the leash, such that when the leash is slack it has a fall point that is rearward of its fall point in the absence of the leash positioner;
    wherein the leash is inserted through the leash guide member and further wherein the leash guide member is configured to prevent the leash from falling below the torso of the pet between the collar and the hind legs of the pet when the leash positioner is in place.

2. The leash positioner of claim 1, wherein the pet is a dog.

3. The leash positioner of claim 1, wherein the strap is configured to secure around the torso at a position along the back of the pet.

4. The leash positioner of claim 1, wherein the strap is configured to secure around the torso at a position along the loin of the pet.

5. The leash positioner of claim 1, wherein the leash guide member is positioned such that it lies above the torso of the pet when the strap is secured to the pet.

6. The leash positioner of claim 1, wherein the leash guide member is positioned such that it lies to one side of the torso of the pet when the strap is secured to the pet.

7. The leash positioner of claim 1, wherein the leash guide member is configured to reposition the leash, such that when the leash is slack it has a fall point that is rearward of the hack of the pet.

8. The leash positioner of claim 1, wherein the leash guide member is configured to reposition the leash, such that when the leash is slack it has a fall point that is rearward of the loin of the pet.

9. The leash positioner of claim 1, wherein leash guide member is configured to reposition the leash, such that when the leash is slack it has as fail point that is rearward of the hip of the pet.

10. The leash positioner of claim 1, wherein the leash guide member comprises a closed loop.

11. The leash positioner of claim 10, wherein the closed loop comprises a joint that allows the loop to be opened and closed.

12. The leash positioner of claim 1, wherein the leash guide member comprises a partially-closed loop having a side opening configured to allow for the lateral insertion of the leash into the loop.

* * * * *

UNITED STATES PATENT AND TRADEMARK OFFICE
CERTIFICATE OF CORRECTION

| | |
|---|---|
| PATENT NO. | : 8,459,212 B2 |
| APPLICATION NO. | : 13/149050 |
| DATED | : June 11, 2013 |
| INVENTOR(S) | : Craig Meisenbach |

It is certified that error appears in the above-identified patent and that said Letters Patent is hereby corrected as shown below:

IN THE CLAIMS

Col. 4; line 25 (claim 7)

Delete the phrase "rearward of the hack" and replace with the phrase --rearward of the back--

Signed and Sealed this
Eighteenth Day of March, 2014

Michelle K. Lee
*Deputy Director of the United States Patent and Trademark Office*